United States Patent

Shigematsu et al.

[15] 3,699,436
[45] Oct. 17, 1972

[54] REMOTELY CONTROLLABLE DEFECT DETECTOR OF ELECTRIC RESISTANCE TYPE

[72] Inventors: Hiroji Shigematsu; Tomio Yamaguchi, both of Kobe; Hisanobu Fukue, Kakogawa; Hiroshi Ogawa; Takashi Hashimoto; Kenichi Murakoshi; Susumu Suguri, all of Mito; Tsutomu Fujimura, Tokai, all of Japan

[73] Assignees: Mitsubishi Jukogyo Kabushiki Kaisha; Japan Atomic Energy Research Institute, Tokyo, Japan

[22] Filed: Feb. 24, 1970

[21] Appl. No.: 13,292

[52] U.S. Cl..................324/65 R, 324/64, 324/72.5, 176/19
[51] Int. Cl. ..............................G01r 27/08
[58] Field of Search ......324/61 P, 65 CP, 65 CR, 64, 324/72.5

[56] References Cited

UNITED STATES PATENTS

| | | | |
|---|---|---|---|
| 2,459,196 | 1/1949 | Stewart | 324/64 X |
| 2,843,823 | 7/1958 | Bayless | 324/72.5 X |
| 2,476,943 | 7/1949 | Brady | 324/64 |
| 2,440,044 | 4/1948 | Greenslade | 324/64 |

Primary Examiner—Herman Karl Saalbach
Assistant Examiner—Paul L. Gensler
Attorney—McGlew and Toren

[57] ABSTRACT

A remotely controllable defect detector, of the electric resistance type, includes a relatively elongated control rod, a guide frame supported at one end of the rod and a contact assembly including a body member supported by the frame. The body member carries a pair of spaced electric current probes for contact with spaced points of an electrically conductive object or body to be checked, to provide a flow of current through the checked body between the contact points, and the body member carries a pair of spaced voltage probes for contact with the checked body to detect the potential difference between points of the checked body. The contact assembly is preferably adjustably mounted on the guide frame, and the guide frame is adjustable relative to the control rod. Control means are provided at the end of the control rod remote from the end thereof carrying the guide frame, and are operable to adjust the contact assembly relative to the control rod. The control means may include, for example, a manually operable member connected to gearing operable to rotate the contact assembly about an axis perpendicular to the control rod. A hydraulic pressure actuator or an electromagnet may be used to press the guide frame firmly into engagement with the body to be checked.

13 Claims, 7 Drawing Figures

PATENTED OCT 17 1972

INVENTORS
HIROJI SHIGEMATSU
TOMIO YAMAGUCHI
HISANOBU FUKUE
HIROSHI OGAWA
TAKASHI HASHIMOTO
KENICHI MURAKOSHI
SUSUMU SUGURI
TSUTOMU FUJIMURA

BY McGlew & Toren
ATTORNEYS

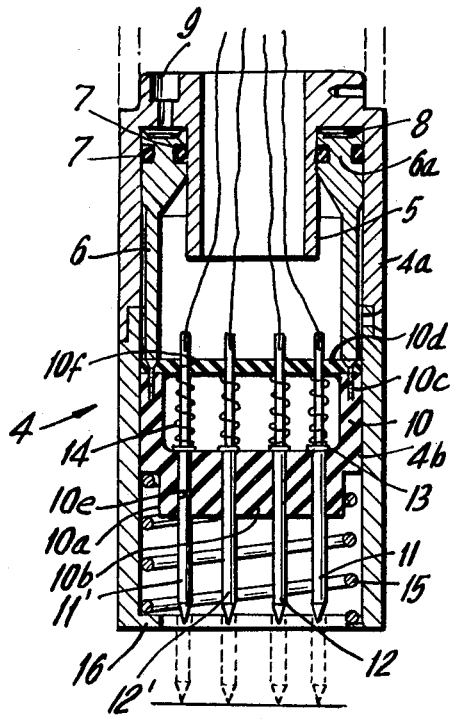

REMOTELY CONTROLLABLE DEFECT DETECTOR OF ELECTRIC RESISTANCE TYPE

BACKGROUND OF THE INVENTION

A conventional instrument for detecting and determining the extent and location of cracks, flaws, or other defects of an electrically conductive body by the so-called electric resistance method comprises a pair of electric voltage probes provided on a body member in spaced relation and located between a pair of electric current probes provided on the body member. A voltmeter is connected to the voltage probes through lead wires, and other lead wires connect a source of electric potential to the current probes. In checking a test electrically conductive body for defects and the like, the tips of the probes are brought into contact with the test body and the electric current probes have a potential supplied thereto so that a predetermined direct current will flow through the conductive body between the current probes. At the same time, the potential difference between the voltage probes is indicated by the voltmeter.

A calibration curve representing the correlation between the potential difference and the depth of a defect is prepared beforehand on the basis of data determined from test pieces of the same material and having defects at known depths. Then, by comparing the measured potential difference between the voltage probes to predetermine potential differences on the calibration curve, the actual depth of any defect in the body being tested can be read and detected.

In recent years, for example, in the periodic inspection of the pressure vessel of a nuclear reactor, increasing attention has been paid to the necessity of checking the pressure vessel, particularly such portions thereof as the nozzle for forced circulation of coolant and also the bottom of the reactor, which are subjected to relatively high stresses, to determine if there are any defects and what is the extent of any defect, in order to ensure the safety of the pressure vessel. However, the radioactive radiation level within the vessel is so high that the vessel usually must be filled with water. In addition, the presence of the nozzle for forced circulation of the coolant, and the reactor bottom, which are located in excess of 10 meters below the top end of the pressure vessel body, as well as the core structure, prevent access of operators to these parts for inspection. The only alternative is to make such an inspection under remote control. Despite this, none of the known instruments of the type described above is capable of being remotely controlled.

SUMMARY OF THE INVENTION

This invention relates to defect detectors of the electric resistance type and, more particularly, to a novel and improved remotely controllable defect detector for detecting defects at substantially inaccessible locations in an electrically conductive member or body to be checked.

The objective of the present invention is to provide such an instrument with which it is possible to detect any crack, flaw, or other defect of an electrically conductive body to be inspected, to determine the depth, length, etc., of any such defect, all by remote control, and to select, by remote control, the region to be checked. For this purpose, a remotely controllable defect detector embodying the invention comprises, in essence, a contact assembly including a pair of electric current probes, arranged to be held in contact with an electrically conductive body being checked to provide a flow of current therethrough, and a pair of electric voltage probes in contact with the body to be checked, to detect the potential difference between points thereof. The detector further includes a guide frame supporting the main body member of the contact assembly, and a control rod that supports, at its lower end, this guide frame. The contact assembly and the guide frame form one assembly, and the guide frame and the control rod form a second assembly, and at least one of these two assemblies is adjustable or movable relative to the other assembly.

An object of the invention is to provide a defect detector of the character described which is capable of remote control, so that the contact assembly, with the current and voltage probes, can be efficiently pressed against an electrically conductive body being checked, whereby to ensure positive contact between the probes and the electrically conductive body.

Another object of the invention is to provide such a defect detector in which not only is the contact assembly pressed sufficiently against the electrically conductive body being checked but also the contact position of the contact assembly, with respect to the electrically conductive body, can be shifted with ease.

A further object of the invention is to provide a remotely controllable defect detector of the electrically resistance type which is simple in construction, economical to manufacture, and efficient in operation.

For an understanding of the principles of the invention, reference is made to the following description of typical embodiments thereof as illustrated in the accompanying drawings:

BRIEF DESCRIPTION OF THE DRAWINGS

In the drawings:

FIG. 4 is a longitudinal sectional view of a contact assembly forming part of the defect detector;

FIG. 5 is a partial vertical sectional view illustrating another embodiment of the invention; and FIGS. 6 and 7 are views explanatory of another embodiment of contact assembly in accordance with the invention.

DESCRIPTION OF THE PREFERRED EMBODIMENTS

Figure 1:
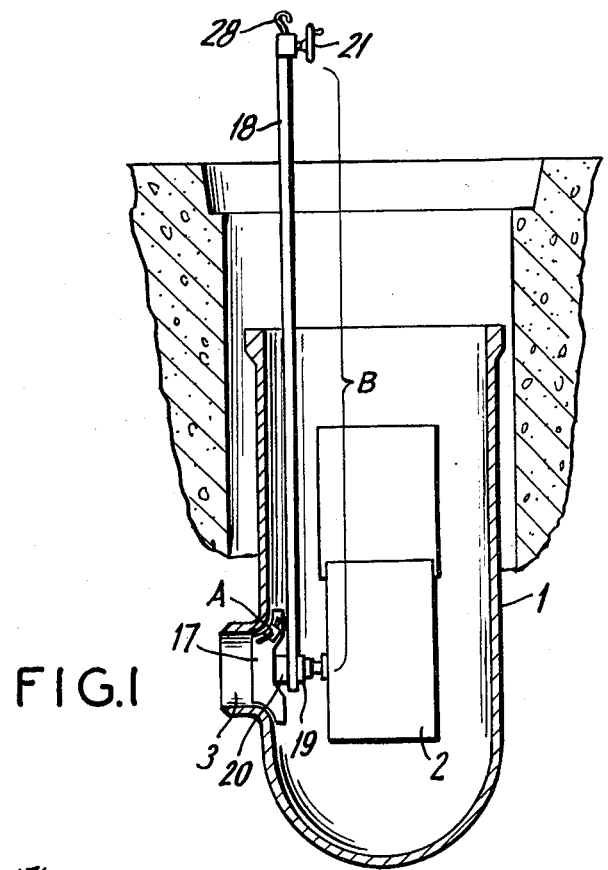
FIG. 1 is a somewhat schematic vertical sectional view illustrating one embodiment of a defect detector in accordance with the invention as used for detecting defects in the nozzle part of a pressure vessel of a nuclear reactor.

Referring first to FIG. 1, an electrically conductive body 1 to be checked is illustrated as a pressure vessel for a nuclear reactor, with the core structure, inside pressure vessel 1, being generally indicated at 2. Vessel 1 includes a nozzle 3 adjacent its lower end for forced circulation of cooling water. The contact assembly of a remotely controllable defect detector embodying the invention is illustrated at A, and is shown in detail in FIG. 4.

Referring to FIG. 4, contact assembly A includes a cylindrical body member 4 consisting of an outer cylindrical body section 4a and an inner cylindrical body section 4b, the adjacent ends of the cylindrical body sections being disengageably connected to each other. The outer portion of body section 4a is provided with an inner cylinder 5 which is concentric and integral therewith. A piston 6 is slidable in body section 4a, between the inner surface of this body section and the outer surface of cylinder 5, and O-rings 7 are mounted on piston 6 to form a seal between this piston, the inner surface of body section 4a and the outer surface of inner cylinder 5. By virtue of the sealing O rings 7, fluid chamber 8 is defined between the head 6a of piston 6, the inner side wall and the outer end wall of body section 4a, and the outer surface of inner cylinder 5. Fluid chamber 8 and piston 6 constitute a hydraulic actuator, and working fluid is supplied to chamber 8 through an inlet port 9 arranged to be connected to a suitable source of hydraulic fluid under pressure.

A cylindrical part or support 10, of electrical insulating or dielectric material, carries a pair of electric current probles 11, 11' and a pair of voltage probes 12, 12'. Support 10 has a reduced diameter portion 10a at its lower end and has a bottom wall 10b. At the upper end of support 10, there is a disk 10d of electrical insulating or dielectric material, which is disengageably fitted in a groove at the top periphery 10c of support 10. Four bores 10e are formed equidistantly through the bottom wall 10b of support 10, and are coaxially aligned with four holes 10f formed in disk 10d. The bores 10e and the holes 10f receive the probes 11, 11' and 12, 12' in a manner such that voltage probes 12, 12' are located intermediate current probes 11, 11', with the upper ends of all of the probles extending beyond disk 10d.

Springs 14 embrace the probes between flanges 13 thereon and disk d, and, under the bias of these springs, the probes are held in place and, if there is some irregularity in the surface to be checked, the individual probes can be relatively displaced in conformity to the particular configuration of the surface to be checked, so as to maintain good contact between the probes and such surface. A larger coil spring 15 is disposed between the step, formed by the reduced diameter portion 10a at the lower part of support 10, and a radially inwardly directed flange 16 at the inner end of inner body section 4b. Spring 15 serves to bias support 10 against the inner end of piston 6, so that probes 11, 11' and 12, 12' are maintained retracted within body member 4 when the hydraulic actuator is not operative.

The surfaces of probes 11, 11' and 12, 12' may be coated with a suitable electrically insulating paint to ensure good electrical insulation. This is particularly desirable in the inspection, for example, of a pressure vessel of a nuclear reactor and which must be filled with water to avoid radioactive hazards.

Referring again to FIGS. 1 to 4, a control rod for a guide frame 17 is indicated at B, and comprises a very substantially elongated outer tube 18 at the bottom end of which a sleeve 20, for a hydraulic jack 19, is supported by support plates 18a secured to tubing 18, and also by collars 20a extending around sleeve 19, the support being such that sleeve 20 can rotate about an axis perpendicular to the axis of tubing 18 but that sleeve 20 cannot move in an axial direction.

A control mechanism is provided at the upper end of tubing 18 of control rod B, and inside the tubing, and this control mechanism comprises a handwheel 21, a connecting rod or shaft 22, bevel gears 23, 24, a worm 25 and a worm gear 26 so that, by maneuvering handwheel 21, hydraulic jack 19 is remotely controlled and sleeve 20 of jack 19 may be rotated.

A guide sleeve or frame 17 supports contact assembly A in position, and this guide sleeve is coupled, at its center, by a pin 27 to the outer end of sleeve 20 of hydraulic jack 19. Accordingly, guide frame 17 rotates together with sleeve 20, thereby effecting rotation or revolution of probes 11, 11' and 12, 12' of contact assembly A supported by frame 17, to provide for shifting the position of the contact assembly with respect to the surface of the conductive body being checked.

The portion of guide frame 17 opposite the surface to be checked has a contour such as to mate substantially with the contours of the opposing surface, so that the guide frame can closely approach the opposite surface. In the particular embodiments shown in the drawings, the contour of the guide frame is made to approach mating relation with the mouth shape of nozzle 3. On both sides, of the opposite ends of that surface of guide frame 17 opposite the surface being checked, there are formed protrusions 17b, 17b which maintain a limited spacing between guide frame 17 an the surface being checked.

Figure 2:
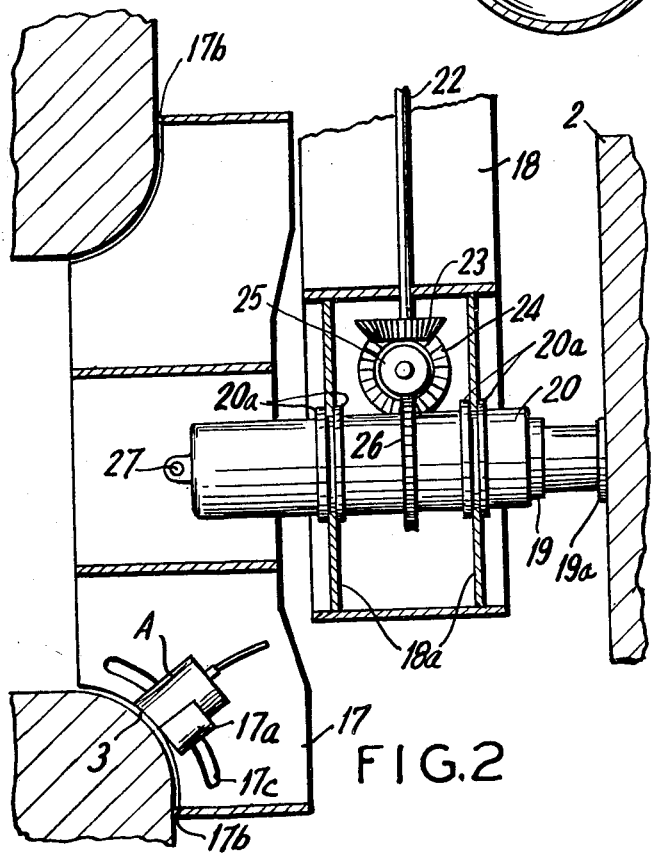
FIG. 2 is a vertical sectional view, to a substantially enlarged scale, of the lower portion of the defect detector as applied to the pressure vessel.
Figure 3:
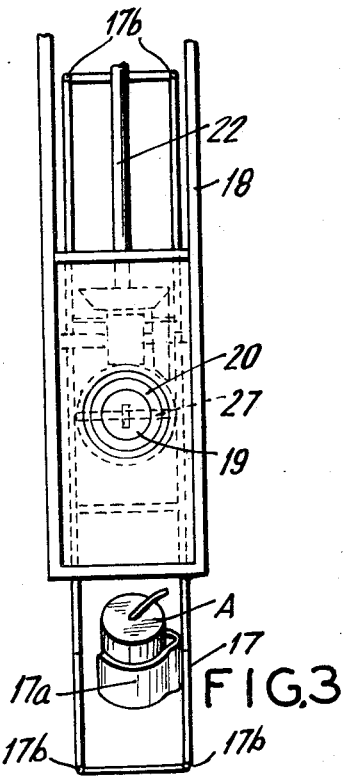
FIG. 3 is a vertical elevation view taken at substantially right angles to the plane of FIG. 2.

As more particularly illustrated in FIG. 2, contact assembly A is mounted on guide frame 17 in a manner such as to be shiftable and adjustable in position, by means of a support arm 17a in engagement with a guide slot 17c formed in frame 17. Shifting and adjustment of the position, and fixing, of support arm 17a, are remotely controlled by a suitable drive mechanism and a suitable control mechanism which are remotely located and which have not been illustrated. However, while it is desirable, from the standpoint of operating efficiency, to control remotely the shifting and adjustment of the position, and the fixing in position, of support arm 17a, a remote control is not always essential.

For example, contact assembly A may be so constructed that it can be elevated to the control stand and then support arm 17a can be manually shifted or adjusted in position or fixed, as by bolting, on guide frame 17.

Hydraulic jack 19 is remotely actuated by fluid pressure from a remotely located source of hydraulic fluid under pressure, and head 19a of jack 19 is brought into contact with core structure 2 of the electrically conductive body being checked, such as the pressure vessel 1 for a nuclear reactor. This produces a reaction force which, in turn, presses protrusions 17b, 17b of guide frame 17 against the surface of the electrically conductive body, for example, against the surface of pressure vessel 1 for a nuclear reactor, which body is being checked so that guide frame 17 is suitably positioned.

In the embodiment illustrated, positioning of guide frame 17 is accomplished by hydraulic jack 19 where there is a stationary object, such as core structure 2, inside the electrically conductive body being inspected.

In the absence of any such stationary internal structure which can serve as a support, hydraulic jack 19 may be replaced by an electromagnet M, as shown in FIG. 5, and which is secured to a suitable point along outer tubing 18 and facing guide frame 17. Electromagnet M is excited from a power source which is remotely located, so that the resultant magnetic attraction positions guide frame 17 in contact with the surface to be checked. A hook 28 is secured to the upper end of outer tubing 18 for control rod B.

A defect detector embodying the invention, and constructed as so far described, is operated in a manner which will now be set forth. To inspect a given part of an electrically conductive body such as nozzle 3 of pressure vessel 1 in the embodiment illustrated, control rod B is initially suspended by hook 28 from a suitable crane, and is lowered to a suitable point inside pressure vessel 1. Following this, control rod B is suitably adjusted up or down, using the crane, until the central part of guide frame 17 for contact assembly A is in a position in alignment with the center of nozzle 3. Insertion and vertical adjustment of control rod B need not always be effected by using a crane, but may be accomplished by other suitable hoisting or conveying means of a known type. Hydraulic fluid under pressure, from a remotely located source, is then supplied to hydraulic jack 19 to actuate this jack to bring jack head 19a into contact with core structure 2 and, at the same time, allow the reaction force to urge protrusions 17b, 17b of guide frame 17 into contact with the surface of nozzle 3 to be checked.

Following this, hydraulic fluid under pressure is supplied to the hydraulic actuator, or fluid chamber 8, of contact assembly A and, by means of piston 6, support 10 is caused to move outward in cylindrical body 4 until the tips of probes 11, 11' and 12, 12' are moved into contact with the surface to be checked. Since probes 11, 11' and 12, 12' are slidable in bores 6a of support 10, under the bias of springs 14, the tips of the probes are kept most satisfactorily in contact with the surface of the conductive body regardless of any surface irregularity thereof. A predetermined direct current from a remote source of potential is then supplied to current probes 11, 11', and the potential difference between voltage probes 12, 12' is detected by a remotely located voltmeter connected to these voltage probes. By this procedure, it can be determined or detected whether there is any crack, flaw, or other defect in the part being checked, and there can also be determined how deep or how long any flaw is, such detection being carried out exactly at the remote point.

Other parts of nozzle 3 are scanned in the following manner. The fluid pressures in the hydraulic actuator of the contact assembly and in hydraulic jack 19 are released, and probes 11, 11' and 12, 12' and protrusions 17b, 17b of guide frame 17, are retracted out of contact with the surface of the conductive body being checked. Handwheel 21 then is maneuvered to rotate guide frame 17 through the control mechanism and the sleeve 20 of hydraulic jack 19, so as to position the guide frame as desired. If necessary, support arm 17a of guide frame 17 may be adjusted along slot 17c remotely by suitable means, or the probes 11, 11' and 12, 12' may be manually positioned. Thereafter, the already described procedure is repeated.

While, in the embodiment of the invention so far described, contact assembly A is provided with a single pair of current probes 11, 11' and a single pair of voltage probes 12, 12' the contact assembly may be designed and constructed, as will now be described, for greater facilitating of the defect detection and determination. Such an embodiment is illustrated in FIGS. 6 and 7.

Referring to FIGS. 6 and 7, a contact assembly A' is provided with a plurality of probes $b_1$, $b_2$, $b_3$, etc. A selecting switch C is connected by leads $d_1$, $d_2$, $d_3$, etc., to the respective probes $b_1$, $b_2$, $b_3$ etc., and is also connected to a source or potential $e$, by leads $g$, and to a voltmeter $f$, by leads $h$. Although, in FIG. 6, the probes $b_1$, $b_2$, $b_3$, etc. are shown as of the same length, the probe lengths may be varied to best meet the contour of the part being checked, as shown in FIG. 7, in order to assure good contact and thus easy and positive detection.

In detecting and determining a crack, flaw, or other detect in an electrically conductive body, using the defect detector shown in FIGS. 6 and 7, contact assembly A' is so positioned that probes $b_1$, $b_2$, $b_3$ etc., are opposed to the surface to be checked and are maintained in contact with the latter. Then selecting switch C is set so as to connect a selected pair or probes to potential source $e$, and also to connect another selected pair of probes, disposed between the first selected pair, to voltmeter $f$. Thereby, a predetermined direct current from source $e$ flows through the pair of probes connected to this source. The potential difference between the probes connected to voltmeter $f$ is then detected by the voltmeter and, using this procedure, it can be determined whether there is any crack and, if there is a crack or flaw, how deep and how long the crack or flaw is, such detection being effected in the usual manner. In order to check any other part adjacent the part already checked, all that is necessary is to set the selecting switch C so that four probes come to face the unchecked part and function in the same manner as already described. Thereby, another part of the body to be checked can be checked out.

By repeating the above procedure while contact assembly A' is maintained in its original position, it is possible to determine if there is any crack, flaw, or other defect on the entire surface of the electrically conductive body that is scanned by the probes $b_1$, $b_2$, $b_3$ $b$ ... $b_n$ and, if there are any cracks, flaws or defects to determine the depth, length, etc. thereof. Thus, once assembly A' is properly positioned, defect detection with respect to an electrically conductive body can be effected continuously over a fairly extensive area proportional to the number of probes $b_1$, $b_2$, $b_3$, etc. available in contact assembly A'. Thereby, the time required for detection of defects can be greatly reduced. Even where any part being checked is surrounded by various members or elements which otherwise hamper the detection operation, the instrument embodying the invention enables detection and determination of defects to be performed in a simplified manner and with an extremely high degree of efficiency.

Summarizing, the defect detector embodying the invention comprises a contact assembly having a pair of electric current probes adapted to be held in contact with an electrically conductive body being checked in order to provide a flow of current through the body, and a pair of electric voltage probes in contact with the conductive body to detect a potential difference in the latter. A guide frame supports the main body member of the contact assembly in position, and this guide frame is supported at the lower or inner end of a control rod. At least either the combination of the contact assembly and the guide frame, or the combination of the guide frame and the control rod, are movable with respect to each other. With the described construction, it is possible, under remote control, to detect if an electrically conductive body being checked has any crack, flaw or other defect and, if there is any such crack, flaw or defect, how deep and how long the same is. Additionally, the area to be checked can be shifted or adjusted by remote control. The instrument thus permits pinpoint detection and determination of any crack, flaw, or other defect of an electrically conductive body, such as a pressure vessel for a nuclear reactor, which requires remotely controlled inspection. By suitably designing the contour of the guide frame, the instrument is easily adapted to scan structures having complicated configurations. These advantageous features add to the industrial utility of the defect detector of the present invention.

While specific embodiments of the invention have been shown and described in order to illustrate the application of the principles of the invention, it will be understood that the invention may be embodied otherwise without departing from such principles.

What is claimed is:

1. A remotely controllable defect detector, of the electric resistance type, comprising, in combination, a relatively elongated control rod; a guide frame supported at one end of said control rod; a contact assembly including a body member supported by said guide frame; at least a pair of spaced electric current probes carried by said body member for contact with spaced points of an electrically conductive body to be checked, and connectable to a source of electric potential for flow of current through the body between the points; at least a pair of spaced voltage probes carried by said body member for contact with the checked body for detection of the potential difference between points of the checked body; means mounting said contact assembly for adjustment relative to said control rod; and control means, at the end of said control rod remote from said one end thereof, operable to adjust said contact assembly relative to said control rod; both said guide frame and said contact assembly being adjustable relative to said control rod.

2. A remotely controllable defect detector, as claimed in claim 1, including means operable to press said contact assembly against the electrically conductive body to be checked.

3. A remotely controllable defect detector, as claimed in claim 2, in which said last named means comprises hydraulic actuator means.

4. A remotely controllable defect detector, as claimed in claim 3, in which said contact assembly includes a probe support mounted in said body member for displacement in the latter; said hydraulic actuator means including a hydraulic actuator in said body member including a chamber formed in said body member, and operable on said support to press said probes into contact with the electrically conductive body to be checked.

5. A remotely controllable defect detector, as claimed in claim 3, wherein said hydraulic actuator means includes a hydraulic actuator, having a fluid chamber, and operable to press said control rod toward the electrically conductive body to be checked.

6. A remotely controllable defect detector, as claimed in claim 2, in which said last named means is operable to press the control rod toward the electrically conductive body to be checked.

7. A remotely controllable defect detector, as claimed in claim 6, in which said last named means comprises a hydraulic cylinder and a piston operable in said cylinder.

8. A remotely controllable defect detector, as claimed in claim 6, wherein said last named means comprises an electromagnet secured to said control rod and operable, when energized, to exert a magnetomotive force pressing said control rod toward the electrically conductive body to be checked.

9. A remotely controllable defect detector, of the electric resistance type, comprising, in combination, a relatively elongated control rod; a guide frame supported at one end of said control rod; a contact assembly including a body member supported by said guide frame; at least a pair of spaced electric current probes carried by said body member for contact with spaced points of an electrically conductive body to be checked, and connectable to a source of electric potential for flow of current through the body between the points; at least a pair of spaced voltage probes carried by said body member for contact with the checked body for detection of the potential difference between points of the checked body; means mounting said contact assembly for adjustment relative to said control rod; and control means, at the end of said control rod remote from said one end thereof, operable to adjust said contact assembly relative to said control rod; said contact assembly being adjustable relative to said guide frame and relative to said control rod.

10. A remotely controllable defect detector, of the electric resistance type, comprising, in combination, a relatively elongated control rod; a guide frame supported at one end of said control rod; a contact assembly including a body member supported by said guide frame; at least a pair of spaced electric current probes carried by said body member for contact with spaced points of an electrically conductive body to be checked, and connectable to a source of electric potential for flow of current through the body between the points; at least a pair of spaced voltage probes carried by said body member for contact with the checked body for detection of the potential difference between points of the checked body; means mounting said contact assembly for adjustment relative to said control rod; and control means, at the end of said control rod remote from said one end thereof, operable to adjust said contact assembly relative to said control rod; said guide frame being formed with a guide slot; and means mounting said contact assembly for adjustment along said guide slot.

11. A remotely controllable defect detector, of the electric resistance type, comprising, in combination, a relatively elongated control rod; a guide frame supported at one end of said control rod; a contact assembly including a body member supported by said guide frame; at least a pair of spaced electric current probes carried by said body member for contact with spaced points of an electrically conductive body to be checked, and connectable to a source of electric potential for flow of current through the body between the points; at least a pair of spaced voltage probes carried by said body member for contact with the checked body for detection of the potential difference between points of the checked body; means mounting said contact assembly for adjustment relative to said control rod; and control means, at the end of said control rod remote from said one end thereof, operable to adjust said contact assembly relative to said control rod; and means mounting said guide frame rotatably on said control rod.

12. A remotely controllable defect detector, of the electric resistance type, comprising, in combination, a relatively elongated control rod; a guide frame supported at one end of said control rod; a contact assembly including a body member supported by said guide frame; at least a pair of spaced electric current probes carried by said body member for contact with spaced points of an electrically conductive body to be checked, and connectable to a source of electric potential for flow of current through the body between the points; at least a pair of spaced voltage probes carried by said body member for contact with the checked body for detection of the potential difference between points of the checked body; means mounting said contact assembly for adjustment relative to said control rod; and control means, at the end of said control rod remote from said one end thereof, operable to adjust said contact assembly relative to said control rod; said contact assembly mounting a plurality of probes in excess of four; and selecting switch means selectively operable to connect a first pair of said probes to a source of electric potential and to connect a second pair of said probes, intermediate the probes of said first pair, to a voltmeter.

13. A remotely controllable defect detector, as claimed in claim 12, in which said probes have different lengths in accordance with the contours of the surface of the electrically conductive body to be checked.

* * * * *